April 12, 1955 W. BENES 2,705,943
INTERNAL COMBUSTION ENGINES
Filed April 22, 1954
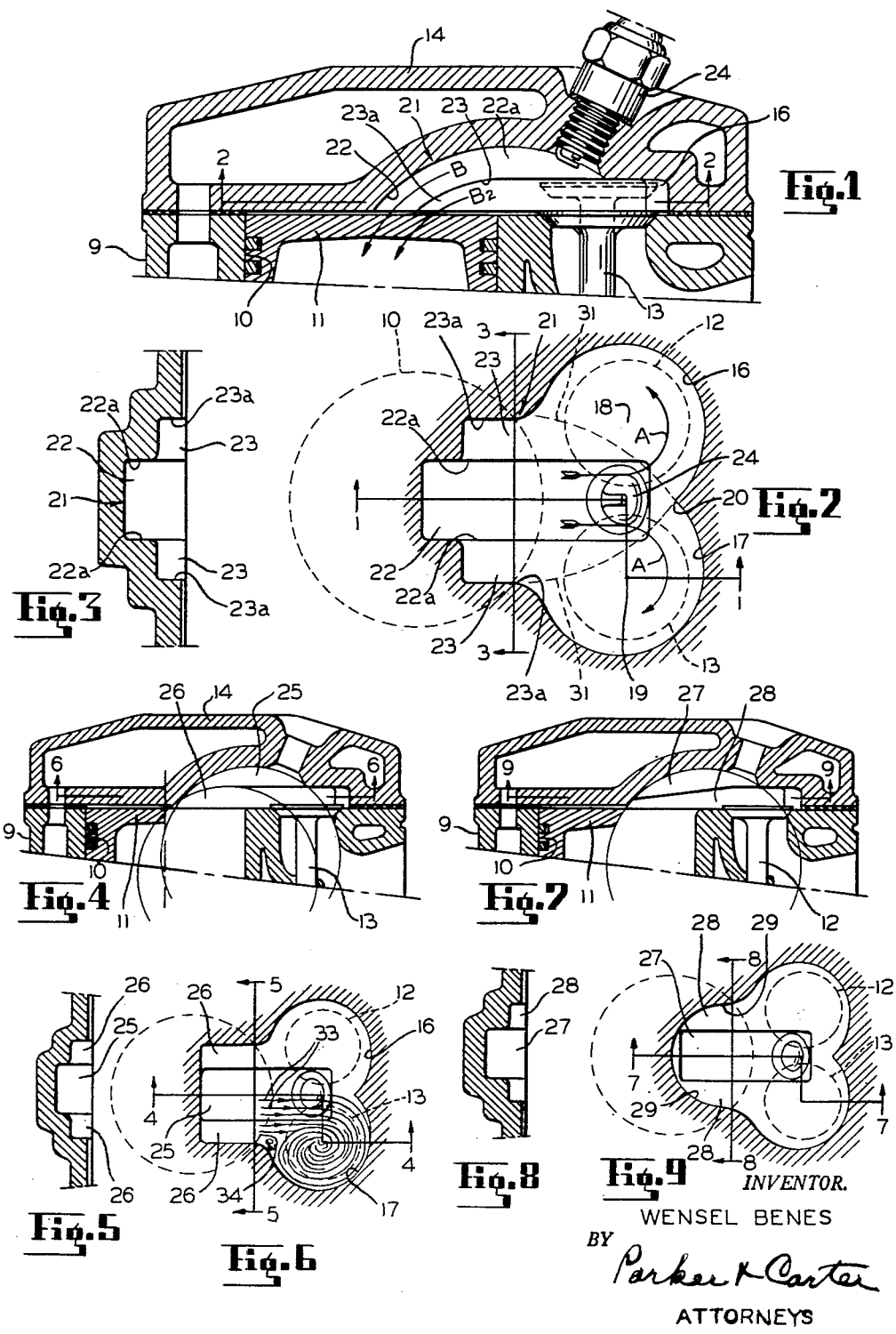
INVENTOR.
WENSEL BENES
BY Parker & Carter
ATTORNEYS

United States Patent Office 2,705,943
Patented Apr. 12, 1955

2,705,943

INTERNAL COMBUSTION ENGINES

Wensel Benes, Lyndon, Wis.

Application April 22, 1954, Serial No. 424,985

4 Claims. (Cl. 123—191)

This invention relates to improvements in internal combustion engines of the L-head type, and has for its principal object to provide an improved form and arrangement of the combustion chamber whereby the flow of combustible gas-air mixture is purposely organized and directed through the several stages of operation of the engine so as to produce maximum efficiency and power.

A further object of the invention is to satisfy conditions for higher compression and better combustion through efficient mixing, homogenizing and equalizing the temperature of the combustible mixture.

Still further objects of the invention are to provide means for relatively unrestricted flow of the gas mixture between the main cylinder and the areas surrounding the inlet and exhaust valves; means for directing the combustible mixture in two oppositely moving swirls over the intake and exhaust valve ports during the compression stroke; and means for concentrating the propagation of flame immediately prior to and during the combustion stroke.

With the recent trend toward higher compression in internal combustion engines, the use of L-head engines has declined because of inherent difficulties of adapting this type of engine to higher compressions. These difficulties are largely due to the conventional shape of the main cylinder with its laterally offset inlet and outlet valves, which does not adapt itself as readily to high compression operation as other types of engines. In particular, modern high compression engines have their compression space so flattened and reduced in area that it has been no longer possible to retain a well defined vertical swirl of gases as they move between the main cylinder and the L-head extension, the advantages of which vertical swirl have heretofore been generally recognized in low compression engine design. Accordingly, the advent of high compression engines has introduced new problems in engine design in order to attain maximum efficiency of performance.

The following general observations will aid in explaining the objects to which my invention is particularly directed.

The shape of the combustion chamber is of greatest importance to proper and efficient combustion, which in turn is dependent upon the performance of the flame in said chamber. The combustion chamber must have the proper shape to insure desired concentration of the incoming mixture, as well as the maximum unrestricted flow of gas for efficient mixing, and the propagation of flame during combustion. It is particularly difficult to satisfy all these requirements in an L-head type of engine so as to afford operation at relatively high compressions comparable to those more readily attainable with other types of engines having more complicated mechanical construction.

Among the difficulties particularly troublesome in L-head type engines is that of unequal distribution in the temperature of the compressed mixture due to hot spots in the cylinder and the valves.

Because of the shape of the chamber and the flow of the gases themselves, some peaks of temperature will be caused in the mixture which produce premature spontaneous local ignition during compression, resulting in inefficient hard running or knocking of the engine.

In the structure of my invention, I minimize the conditions tending to produce such hot spots; for instance, the flow of mixture during the compression stroke is directed into two swirls running over the valve heads in opposite directions so as to cool the hot exhaust valve and also aid in mixing combustible gas while increasing its temperature.

In standard L-head type engines, the propagation of flame initiating from the spark is relatively moderate and increases with the velocity of flow. The travel of flame must necessarily extend a considerable distance into the main cylinder.

In carrying out my invention, I provide an improved design and arrangement for aiding the propagation of flame with the most efficient distribution. This is accomplished by making full use of my novel form of combustion chamber, including two partially cylindrical areas immediately above the inlet and outlet valves, respectively, (which, for convenience, I term "cyclonic chambers"), and a horizontal composite communicating passage between these cyclonic chambers and the main cylinder, which consists of a relatively wide lower portion of approximately the same height as the cyclonic chambers and a superimposed centrally disposed vertically arched channel or groove, narrower than the lower passage. This upper channel or groove I term the "blowing groove." This arched blowing groove is especially designed to provide a well defined vertical swirl or turbulence in the gases, affording those same advantages of the vertical swirl heretofore employed in low compression engines, but in addition, said blowing groove cooperates with the two cyclonic chambers so as to re-direct the gases in streamlined form into two contra-moving swirls within said cyclonic chambers, as will presently be more fully described.

By virtue of the arrangement of the two horizontally exposed cyclonic chambers and the communicating passages with the main cylinder being a vertically arched blowing groove, the gases are directed with unique swirling actions by the main cylinder and an "L" head extension during exhaust and intake strokes, so as to produce a single vertical swirl when entering or leaving the main cylinder, but the gases are redirected into two generally horizontal swirls within the two cyclonic chambers.

The present application is a continuation-in-part of my prior application, Ser. No. 296,666, filed July 1, 1952, now abandoned.

The invention may best be understood by reference to the accompanying drawing, in which:

Figure 1 is a vertical section taken through the cylinder head of an internal combustion engine constructed in accordance with my invention.

Figure 2 is a horizontal section taken generally on line 2—2 of Figure 1.

Figure 3 is a detail section taken on line 3—3 of Figure 2.

Figure 4 is a sectional view similar to Figure 1, on a reduced scale, but showing a variant form of the invention.

Figure 5 is a detail section taken on line 5—5 of Figure 4.

Figure 6 is a section taken on line 6—6 of Figure 4, showing more or less diagrammatically the swirling action of the gases in one of the cyclonic chambers as for instance during compression or exhaust strokes.

Figure 7 is a sectional view similar to Figures 1 and 4, but showing another variant form of the invention.

Figure 8 is a detail section taken on line 8—8 of Figure 7.

Figure 9 is a section taken on line 9—9 of Figure 7.

Referring now to details of the embodiment of the invention illustrated in Figures 1–3, a cylinder block 9 has a main cylinder 10 with a piston 11 operating therein, and poppet valves 12 and 13 closing laterally offset inlet and outlet ports in the cylinder block, as is usual with T-head engines. A cylinder head 14 is detachably secured to the top of the cylinder block and has its undersurface formed to provide the upper part of a combustion chamber extending laterally aproximately from the center of the main cylinder into communication with the inlet and outlet valves 12 and 13.

As will be seen in Figures 1 and 2, the part of the combustion chamber over the inlet and outlet valves 12 and 13, is formed by a pair of partially cylindrical sub-chambers 16 and 17, the outer and side walls of each of which are formed on continuous arcs centered substantially at points 18 and 19 which are slightly offset inwardly of the centers of the inlet and outlet valves 12, and 13, respectively, and toward the main cylinder, so that the two sub-chambers are disposed symmetrically toward opposite sides of a vertical plane intersecting the axis of the main cylinder. These two sub-chambers 16 and 17, which I term "cyclonic chambers" adjoin each other along an upright, centrally disposed V-shaped edge 20 and also open into a passage indicated generally at 21 leading into the main cylinder 10.

The passage 21 consists of a central relatively high, narrow channel portion 22, with upright parallel side walls 22a, and lower laterally widened channel portions 23, 23 along opposite sides of the central passage, each with upright parallel side walls 23a. The high central channel portion 22 is approximately one-half the width of the lower channel portion, so that the two channel portions form, in effect, an inverted T shaped passage when seen in cross-section, as in Figure 3. For convenience, I term the central channel portion 22 a "blowing groove."

The top walls of both the blowing groove and the lower widened channel portions are arched downwardly at their inner ends where they both extend toward the center of the cylinder space a substantial distance so as to avoid any vertical restriction of the gases as they pass from the sub-chambers 16 and 17 into the main cylinder. In the form shown in Figures 1 to 3, the top walls of the blowing groove and the lower channel portions are formed on mutually concentric arcs. The top wall of the blowing groove extends substantially to the center of the main cylinder at one end and to a point adjacent the V-shaped edge 20, between the two cyclonic chambers 16 and 17. The top walls of the lower side portions 23 of the passage 21 merge into the top walls of the cyclonic chambers 16 and 17 at approximately the same height of the latter (see Figure 1).

Among the advantages of the concentric formation of the blowing groove and the lower channel portions just mentioned, is the fact that the entire central passage 21 can be machined with a single rotary cutting tool, if desired.

As will be also seen from Figure 1, the arrangement of the composite arched passage 21 is such that it is of substantially maximum cross-sectioned area where it crosses over the adjacent rim of the main cylinder, for reasons that will presently appear.

As will be seen from Figure 2, the total width of the passage 21, including the widened lower portions 23, is approximately two-thirds of the full diameter of the main cylinder 10. Since as previously mentioned, the blowing groove 22 is approximately one-half the total width of the entire passage 21, said blowing groove is therefore approximately one-third the full diameter of the main cylinder 10.

Ignition means, herewith consisting of a spark plug 24, is preferably located near the outer end of the arched blowing groove midway between the cyclonic chambers 16 and 17.

Figures 4, 5 and 6 show a variant form of engine wherein the top wall of a blowing groove 25 is formed about a radius centered approximately below the proximate rim of the main cylinder, as in the case of the corresponding blowing groove 22 of Figures 1, 2 and 3, but the arcuate top walls of the lower channel portions 26, 26 are formed about a different center off-set inwardly and downwardly from the center about which the arcuate blowing groove 25 is centered.

In the variant form shown in Figures 7, 8 and 9, the blowing groove 27 is arcuately formed in substantially the same manner as in the forms shown in Figures 1 and 4, but a widened lower side portions 28, 28 connecting the cylinder with the cyclonic chambers 16 and 17 is formed with side walls 29, 29, generally semi-circular in plan view, which meet the inner end of the blowing groove 27 substantially at the axis of the main cylinder. The top walls of the semi-cylindrical lower portion may be inclined downwardly from the top walls of the cyclonic chambers and formed with a substantially plane surface so that said lower portion 28 can be machined with the same rotary cutting tool as used for said cyclonic chambers.

Among other detailed features generally common to the several variant forms of engines hereinabove described, may be mentioned the following: The diameters of the inlet and exhaust valves 12 and 13 are somewhat greater in proportion to the diameter of the cylinder than is usually the case with L head type engines; in the form shown the valves each being approximately one-half the diameter of the cylinder. However, the sub-chambers 16 and 17 in which these valves are located have diameters approximately two-thirds the diameter of the main cylinder, so that there is ample space between the valve heads and the nearest walls of the sub-chambers to facilitate flow of gases through the valve ports when their respective valves are open, even though the valves are slightly off-set toward the outermost walls of the sub-chambers.

It will be observed further, in Figure 2 that each of the cyclonic chambers have substantially the same diameter as the total width of the lower channel portions 23, 23, and that lines 31, 31 forming continuations of the arcuate side walls of each sub-chamber 16 and 17 beyond the V-shaped dividing edge 20 extend in smooth arcs merging tangentially into the upright side walls 23a of the opposite lower channel portions 23. This arrangement enables a streamlined low-resistant flow of gases between the two cyclonic chambers 16 and 17 and the central passage 21 at certain times during the operation of the engine, as presently will be described.

The preferred proportions between the blowing groove 22 and the widened lower channel portions 23, 23 are such that approximately two-thirds of the gases pass along the vertical area of the blowing groove 22, while the remainder of the gases pass along the two lower channel portions 23, 23 at opposite sides of the blowing groove. Substantially the same proportions of gas-flow occur in the variant forms shown in Figures 4 to 6 and 7 to 9.

The use and operation of the improved form of combustion chamber is as follows:

It may be observed generally that with most conventional high compression engines the combustion chamber is not capable of producing predetermined streamlined, but turbulent flow in the several parts of the combustion chamber for effecting a more efficient mixing and burning of the gases as with applicant's improved design. As indicated diagrammatically in Figure 2, the large arrows A, A indicate the flow of gases from the main cylinder into the cyclonic chambers 16 and 17 during the compression stroke. It will be noted that some portion of the gas flow will be directed through and along the relatively low side channel portions 23, 23 of the transverse passage 21, but that a much greater portion of the flow will be directed through and along the higher channel portion 22, so that the flow, as a whole, will tend to be directed into the L-shaped extension toward the upstanding V-shaped edge 20, and there divided into two equal swirls in the sub-chambers 16 and 17. While passing through and along the arched blowing groove 21, a vertical turbulence will be imparted to the gas stream as the gases move over the rim of the cylinder and into the latter during the intake and ignition strokes, as indicated generally by arrows B and B¹ as seen in Figure 1.

Referring again to the two streams entering the sub-chambers 16 and 17 as indicated generally by arrows A, A in Figure 2, these two streams form swirls in said chambers rotating in opposite directions to each other. This positively directed swirling action produces far more effective mixing action of the gases as they are being compressed in the L-head extension, than is the case with conventional L-head constructions, not only because of the resulting turbulence, but because the combined flow of gases from the high blowing groove 22 and the lower side channel portions 23, 23 tend to increase the velocity of the gases during the swirling action within the cyclonic chambers. With the relative proportions shown in Figures 1 to 3, the swirling movement of the gases in the sub-chambers 16 and 17 is approximately twice the speed of revolution of the engine. This results in a more efficient mixing, homogenizing, and equalizing of the temperature of the mixture during the compression stroke than is possible in conventional L-head constructions.

It will be noted especially in Figure 6 that the swirling action in the lower cyclonic chamber 17 during the compression stroke is shown diagrammatically by a series of arrows 33, 33 passing from the transverse passage 21 and the cyclonic chamber 16 is such that practically all of the gas flow is directed toward the inner side of the vertical axis or center point 18 of the chamber 16, while only a very minor marginal part of the gas flow along the side wall 23a of the side channel portions 23 may tend to turn negatively against the main swirl, as indicated by the smaller arrows 34 in Figure 6. The minor turbulence indicated by these small arrows 34 will have no appreciable effect upon the major swirl or turbulence indicated by arrows 33.

Substantially the same condition exists with respect to the cyclonic turbulence in the variant forms shown in Figures 2 and 9.

The shape of the combustion chamber, including the arcuate T-shaped blowing groove, also serves an important function in concentration of the mixture around the spark plug 24, both for ignition and quick burning after ignition. Since practically all of the combustible mixture is confined in the cyclonic chambers and the T-shaped blowing groove at the instant of ignition, it is important that the burning gases pass freely and unrestrictedly from the cyclonic chambers into the main cylinder during flame propagation. The additional vertical turbulence previously mentioned as produced by the flow of gases as they pass through the arched blowing groove into the main cylinder aids materially in effecting a uniformly accelerated flame propagation, for maximum economy. This vertical turbulence is also especially advantageous during the intake stroke, since it tends to reduce concentration of the cooler explosive mixture upon localized areas of the cylinder walls.

Assuming that the exhaust valve is located in subchamber 17, the swirling action will greatly accelerate the egress of gas through the exhaust port.

Referring to the variant form of combustion space shown in Figures 7, 8 and 9, it will be understood that the lower side portions 28, 28, are generally flared along their side walls 29, 29 instead of having upright straight walls parallel with the central blowing groove 30. With this latter arrangement, a slightly greater negative swirling movement is produced at opposite sides of the juncture between the side channels 28, 28 and their respective cyclonic chambers, so that the major swirling effect in the cyclonic chambers may not be quite as efficient as in the two variant forms shown in Figures 2 and 6. Nevertheless, since approximately two-thirds, by volume, of the gases are directed through the blowing groove 30, this negative swirl will still be of minor importance, off-set largely by a somewhat more favorable concentration of gases in the combustion space, particularly during the ignition stroke, when the flame tends to travel in a slightly wider and shorter path into the main cylinder.

From the above description of detailed features of the shape of the combustion space, it will now be manifested that the novel shape of the cyclonic chambers and the passage connecting these chambers with the main cylinder is such as to produce streamlined passage of gases between the cyclonic chambers and the main cylinder with minimum resistance to flow, in a vertically turbulent stream caused primarily by the arched central blowing groove, but that the gases are re-directed within the cyclonic chambers into contrarunning horizontal swirls, so as to increase the efficiency and economy of the engine throughout its several stages or cycles of operation.

I claim:

1. In an L-head internal combustion engine, a cylinder block having a cylinder, a piston reciprocating therein, a cylinder head closing the top of said cylinder and forming therewith a combustion chamber with inlet and exhaust valves offset laterally of said cylinder in side-by-side relation to each other, said combustion chamber including similar semi-circular subchambers surrounding said valves and communicating with each other and with said piston cylinder through a transverse passage having side walls disposed symmetrically with respect to the subchambers and the axis of the cylinder, said transverse passage being of inverted T-shape in cross section, with a relatively narrow upper portion having parallel side walls and a relatively wide lower portion, both of said portions having their inner ends arched downwardly over the cylinder and toward the center of the latter to permit vertically unrestricted flow from said portions into said cylinder, the wide lower portion being of substantially the same width over the proximate rim of the cylinder as the diameter of said subchambers, and the side walls of said lower portion thence diverging arcuately into the side walls of the adjacent subchambers to permit horizontally unrestricted flow between said cylinder and each of said subchambers.

2. The structure of claim 1, wherein the side walls of the wide lower portion over the proximate rim of the cylinder are spaced apart approximately the same distance as the centers of the two subchambers.

3. The structure of claim 2, wherein the arched inner end of the wide lower portion of the transverse passage has parallel side walls extending over the cylinder.

4. The structure of claim 3, wherein the inner end of the narrow upper portion over the cylinder is approximately one-half the width of the adjacent inner end of the wide lower portion, and the wide lower portion is of substantially the same height as the two subchambers over the proximate rim of the cylinder.

References Cited in the file of this patent

UNITED STATES PATENTS

| | | |
|---|---|---|
| 1,671,926 | Coverstone | May 29, 1928 |
| 2,086,427 | Mock | July 6, 1937 |